United States Patent
Beaurepaire et al.

(10) Patent No.: US 11,085,778 B2
(45) Date of Patent: Aug. 10, 2021

(54) METHOD AND APPARATUS FOR PROVIDING OPPORTUNISTIC INTERMODAL ROUTES WITH SHARED VEHICLES

(71) Applicant: HERE GLOBAL B.V., Eindhoven (NL)

(72) Inventors: Jerome Beaurepaire, Berlin (DE); Jens Unger, Berlin (DE)

(73) Assignee: HERE Global B.V., Eindhoven (NL)

( * ) Notice: Subject to any disclaimer, the term of this patent is extended or adjusted under 35 U.S.C. 154(b) by 115 days.

(21) Appl. No.: 16/208,042

(22) Filed: Dec. 3, 2018

(65) Prior Publication Data

US 2020/0173796 A1  Jun. 4, 2020

(51) Int. Cl.
*G01C 21/34* (2006.01)
*G06Q 10/02* (2012.01)

(52) U.S. Cl.
CPC ..... *G01C 21/3438* (2013.01); *G01C 21/3415* (2013.01); *G06Q 10/02* (2013.01)

(58) Field of Classification Search
CPC . G06Q 10/02; G01C 21/3415; G01C 21/3438
USPC ........................................... 701/411
See application file for complete search history.

(56) References Cited

U.S. PATENT DOCUMENTS

| | | | | |
|---|---|---|---|---|
| 2009/0326991 A1* | 12/2009 | Wei | ................. | G06Q 10/08355 705/5 |
| 2014/0172727 A1* | 6/2014 | Abhyanker | ........ | G06Q 30/0645 705/307 |
| 2016/0027307 A1* | 1/2016 | Abhyanker | ............ | G06Q 50/01 701/117 |
| 2016/0231129 A1 | 8/2016 | Erez et al. | | |
| 2016/0247094 A1* | 8/2016 | Scicluna | ................ | G06Q 10/02 |
| 2016/0247095 A1* | 8/2016 | Scicluna | ................ | G06Q 10/02 |
| 2016/0321566 A1 | 11/2016 | Liu et al. | | |
| 2016/0321771 A1* | 11/2016 | Liu | ..................... | G01C 21/3438 |
| 2016/0364678 A1* | 12/2016 | Cao | ......... | G06Q 50/30 |
| 2016/0364679 A1* | 12/2016 | Cao | ......... | G06Q 50/30 |
| 2016/0364812 A1* | 12/2016 | Cao | ......... | G06Q 50/30 |

(Continued)

FOREIGN PATENT DOCUMENTS

CN   108151754 A   6/2018

OTHER PUBLICATIONS

Office Action for corresponding European Patent Application No. 19213009.4-1001, dated Apr. 30, 2020, 10 pages.

(Continued)

*Primary Examiner* — Atul Trivedi
(74) *Attorney, Agent, or Firm* — Ditthavong, Steiner & Mlotkowski

(57) ABSTRACT

An approach is provided for generating a dynamic navigation route based on the availability of a shared vehicle, for example, in a geofenced area for one embodiment. The approach involves identifying a navigation route along which a shared vehicle provider operates based, at least in part, on a distance threshold, wherein the navigation route is an optimal route. The approach also involves monitoring the navigation route to detect a change in current availability of the shared vehicle. The approach further involves recomputing the navigation route to include a route segment associated with the shared vehicle based on determining that the detected change indicates that the shared vehicle has become available.

19 Claims, 11 Drawing Sheets

(56) References Cited

U.S. PATENT DOCUMENTS

| | | | |
|---|---|---|---|
| 2016/0364823 A1* | 12/2016 | Cao | G06Q 50/30 |
| 2017/0123421 A1* | 5/2017 | Kentley | G08G 1/202 |
| 2017/0167882 A1 | 6/2017 | Ulloa Paredes et al. | |
| 2017/0213273 A1 | 7/2017 | Dietrich et al. | |
| 2017/0268892 A1 | 9/2017 | Singh et al. | |
| 2017/0307392 A1 | 10/2017 | Kitajima et al. | |
| 2017/0316621 A1* | 11/2017 | Jefferies | G06Q 50/30 |
| 2018/0091930 A1* | 3/2018 | Jefferies | H04L 63/08 |
| 2018/0259976 A1* | 9/2018 | Williams | G01C 21/32 |
| 2018/0376305 A1* | 12/2018 | Ramalho de Oliveira | G08G 1/096775 |
| 2018/0376357 A1* | 12/2018 | Tavares Coutinho | H04L 67/10 |
| 2019/0050634 A1* | 2/2019 | Nerayoff | G07B 15/00 |
| 2019/0279440 A1* | 9/2019 | Ricci | H04W 4/48 |
| 2019/0291726 A1* | 9/2019 | Shalev-Shwartz | B60W 30/18163 |
| 2019/0303807 A1* | 10/2019 | Gueye | G06Q 10/02 |
| 2020/0042019 A1* | 2/2020 | Marczuk | G08G 1/205 |
| 2020/0084193 A1* | 3/2020 | Beaurepaire | H04L 63/105 |
| 2020/0160709 A1* | 5/2020 | Ramot | G06Q 10/109 |
| 2020/0193550 A1* | 6/2020 | Colonna | H04W 24/10 |

OTHER PUBLICATIONS

Miguel, "Citymapper", retrieved on Dec. 3, 2018 from https://content.citymapper.com/news/1465/a-letter-from-an-ex-seattleite-to-all-seattleites, pp. 1-4.

* cited by examiner

METHOD AND APPARATUS FOR PROVIDING OPPORTUNISTIC INTERMODAL ROUTES WITH SHARED VEHICLES

BACKGROUND

Vehicle sharing services (e.g., cars, bicycles, scooters, etc.) offer great flexibility in where users can pickup and drop off shared vehicles. However, this flexibility also presents significant problems for service providers when integrating shared vehicles into multimodal or intermodal navigation routes that combine different modes of transportation for a user to reach a destination. In other words, service providers face significant technical challenges with respect to monitoring when and where shared vehicles may become available and then surface these new travel "opportunities" to a user even after the user starts a route.

Some Example Embodiments

Therefore, there is a need for an approach for providing a dynamic navigation route that can automatically adapt to opportunistic availability of shared vehicles.

According to one embodiment, a method for an opportunistic use of a shared vehicle for a navigation route comprises identifying the navigation route along which a shared vehicle provider operates based, at least in part, on a distance threshold, wherein the navigation route is an optimal route. The method also comprises monitoring the navigation route to detect a change in current availability of the shared vehicle. The method further comprises recomputing the navigation route to include a route segment associated with the shared vehicle based on determining that the detected change indicates that the shared vehicle has become available.

According to another embodiment, an apparatus for an opportunistic use of a shared vehicle for a navigation route comprises at least one processor, and at least one memory including computer program code for one or more computer programs, the at least one memory and the computer program code configured to, with the at least one processor, cause, at least in part, the apparatus to identify a geofenced area of the navigation route in which a shared vehicle provider operates but in which there is no current availability of a shared vehicle. The apparatus is also caused to monitor the geofenced area to detect a change in the current availability of the shared vehicle. The apparatus is further caused to recompute the navigation route to include a route segment associated with the shared vehicle in the geofenced area based on determining that the detected change indicates that the shared vehicle has become available.

According to another embodiment, a non-transitory computer-readable storage medium for an opportunistic use of a shared vehicle for a navigation route carries one or more sequences of one or more instructions which, when executed by one or more processors, cause, at least in part, an apparatus to identify a geofenced area of the navigation route in which a shared vehicle provider operates but in which there is no current availability of a shared vehicle. The apparatus is also caused to monitor the geofenced area to detect a change in the current availability of the shared vehicle. The apparatus is further caused to recompute the navigation route to include a route segment associated with the shared vehicle in the geofenced area based on determining that the detected change indicates that the shared vehicle has become available.

According to another embodiment, an apparatus for an opportunistic use of a shared vehicle for a navigation route comprises means for identifying the navigation route along which a shared vehicle provider operates based, at least in part, on a distance threshold, wherein the navigation route is an optimal route. The apparatus also comprises means for monitoring the navigation route to detect a change in current availability of the shared vehicle. The apparatus further comprises means for recomputing the navigation route to include a route segment associated with the shared vehicle based on determining that the detected change indicates that the shared vehicle has become available.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a dynamic navigation route based on the availability of a shared vehicle in a geofenced area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
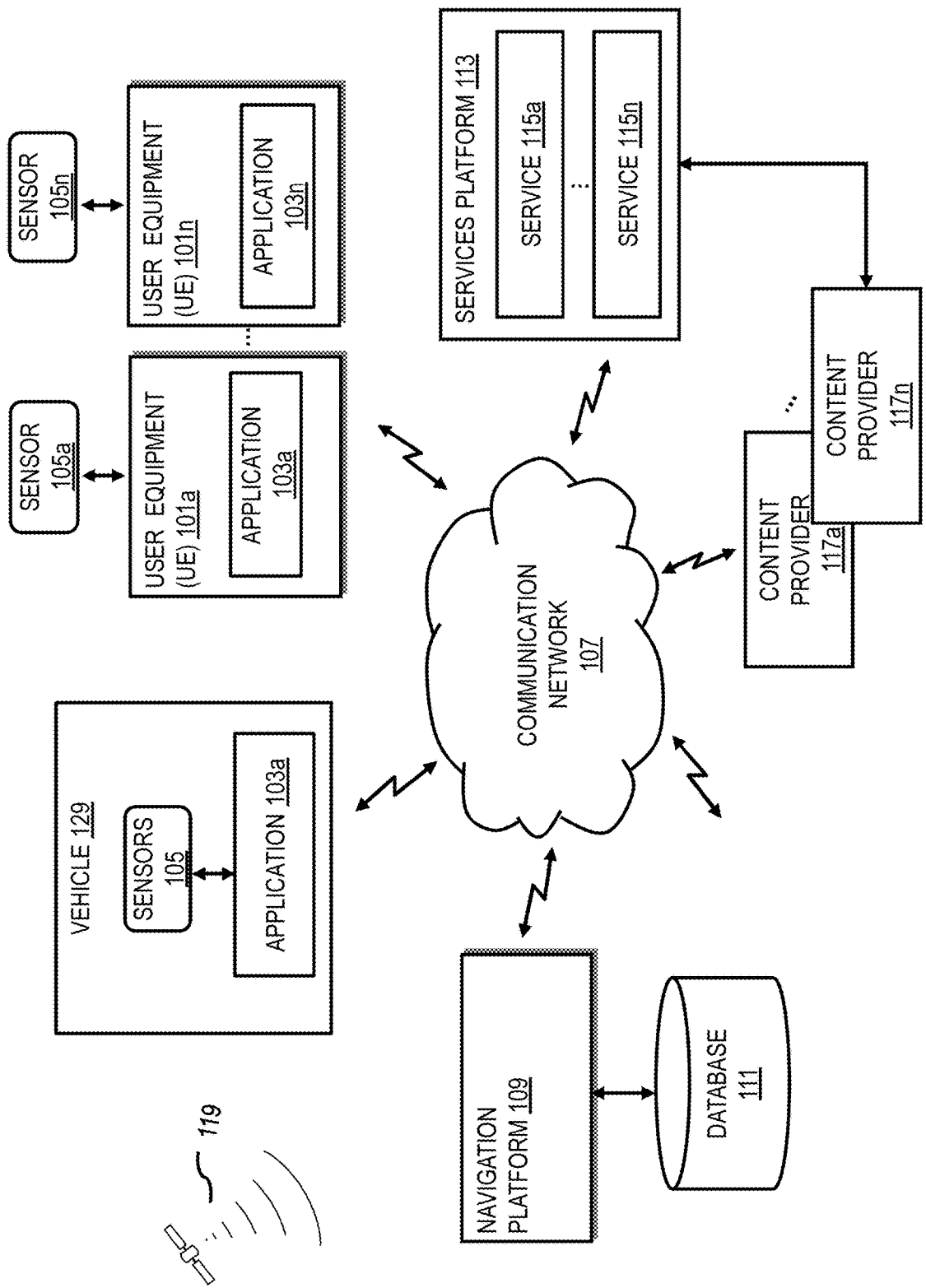
FIG. 1 is a diagram of a system capable of providing a dynamic navigation route based on the availability of a shared vehicle in a geofenced area, according to one example embodiment.

FIG. 1 is a diagram of a system capable of providing a dynamic navigation route based on the availability of a shared vehicle in a geofenced area, according to one embodiment. Multimodal or intermodal routes combine multiple different modes of transportation (e.g., personal vehicle, shared vehicle, public transportation, etc.) to provide a best (e.g., fastest time, shortest distance, etc.) navigation route to a destination. For example, when a user requests an intermodal route from a navigation system, a navigation routing engine can identify all available transportation options and select the best options to destination. However, this computed route is only best with respect to information available to the routing engine at the time that the routing engine computed the route. This limited information can be problematic particularly with respect to using or evaluating the use of shared vehicles as a transportation option for at least one segment of the computed route.

For example, some cities or areas contain thousands of shared vehicles that could possibly influence computed navigation routes by providing faster or more efficient transportation options. However, knowledge of when or where these shared vehicles will become available for use as an option in an intermodal route can be incomplete. This is because shared vehicles users often use these vehicles for unknown periods of time that can be difficult to predict. In the case of dockless vehicles or vehicles that do not have to be returned to specific locations, their check-in locations from a previous user can also be unknown which adds to the uncertainty. Because of this uncertainty of availability, modern multimodal or intermodal routing engines may have difficulty guaranteeing that the best computed route at the start of navigation remains the best as the route is being traveled by a user and new "opportunities" (e.g., opportunistic availability of shared vehicles) are created during the trip itself. In other words, new travel options may appear during a trip (e.g., caused by a shared bike being checked-in or checked-out at the right location for a given user on her/his current route). Determining when these opportunities arise and how to present those opportunities to users already engaged in a route present significant technical challenges.

To address these challenges, system 100 of FIG. 1 introduces the capability of providing a dynamic navigation route based on the availability of a shared vehicle in designated areas of interest (e.g., a geofenced area or other bounded area) of the navigation route. In one embodiment, these areas of the navigation route can be determined based on computing a probability that use of a shared vehicle in those areas of the route can result in improved time of arrival, shorter travel distance, less travel time, etc. By focusing resources to monitor for shared vehicles in only those areas that are likely to make a difference in travel time, system 100 advantageously avoids having to monitor surrounding areas along the entire route. As a user travels along the dynamic route, system 100 monitors those areas of interest to determine whether previously unknown or unavailable shared vehicles have opportunistically become available. If a shared vehicle does become available and can improve travel times, distances, etc. in that segment of the user's multimodal or intermodal route, system 100 proactively reserves or books the shared vehicle (e.g., without user intervention). Then when the user approaches that segment of the dynamic route with the proactively booked shared vehicle, the booking can be surfaced or presented (e.g., a user interface on a device) to the user who then has the option to take the opportunistic option or continue on the route unchanged. Opportunistic, for instance, refers to a transportation option that was not known to system 100 or for which system 100 had no or insufficient data to predict that such an option would become available at the needed time and location.

In this way, system 100 allows users to be informed about dynamic travel options being created on their routes by the shared vehicles that are moving around the area of interest. As noted, system 100 achieves this by monitoring in real-time the availability of the shared vehicles in the areas of interest and then recomputing the route incorporating the available shared vehicles. For example, system 100 performs a multimodal route planning by combining schedule-based transportation, e.g., buses, trains, etc., with unrestricted modes of transportation, e.g., cycling, walking, driving, etc. In one scenario, if a ride-sharing bicycle is returned to a location of interest, and it would be faster for a user to take that bicycle instead of continuing to follow the original route, e.g., train, system 100 recommends the user to change the route and take the bicycle.

In one embodiment, system 100 provides a method for computing opportunistic combinations of intermodal routes with shared vehicles within geofenced areas. System 100 identifies dynamic travel options that are created on a user's multimodal route due to shared vehicles becoming available in the areas of interest. In one scenario, system 100 identifies areas where the availability of an alternate mode of transport significantly impacts a user's ETA and monitors the dynamic availability of shared vehicles in these areas of interest. System 100 then recomputes the existing route using a newly available shared vehicle, reserves the vehicle for the user and notifies the user about the new multimodal route. Accordingly, System 100 makes use of the opportunities created by combining all the available shared vehicles with existing public transport infrastructure.

In one embodiment, navigation platform 109 may be a platform with multiple interconnected components. The navigation platform 109 may include multiple servers, intelligent networking devices, computing devices, components, and corresponding software for providing a dynamic navigation route based on the availability of a shared vehicle in a geofenced area. Though depicted as a separate entity in FIG. 1, it is contemplated that navigation platform 109 may be implemented as a module of any of the components of system 100, e.g., vehicle 129, UE 101, services platform 113, any of services 115*a*-115*n* of services platform 113, etc. The functions of navigation platform 109 are discussed with respect to FIGS. 2-7 below.

In one embodiment, navigation platform 109 provides a multimodal and intermodal capability by identifying a geofenced area of a navigation route in which a shared vehicle provider operates but in which there is no current availability of a shared vehicle. Thereafter, navigation platform 109 monitors the geofenced area to detect a change in the current availability of the shared vehicle. Subsequently, navigation platform 109 recomputes the navigation route to include a route segment associated with the shared vehicle in the geofenced area based on determining that the detected change indicates that the shared vehicle has become available.

In one embodiment, to efficiently monitor pluralities of opportunities appearing during a user's journey, navigation platform 109 implements a routing algorithm that precomputes and identifies the geofenced area, e.g., an area of interest, in the navigation route before the navigation route is used by the user. The geofenced area determined by the routing algorithm of the navigation platform 109 is based on establishing that the availability of an alternate transport mode, e.g., a shared bike, a shared autonomous vehicle, etc., in any of these geofenced areas can positively impact the ETA, e.g., if a shared bike becomes available in the geofenced area around a subway station, this can create a shortcut for the user and reduces his/her travel time. In one scenario, the determination of geofenced area is not mandatory and is optional, however determining geofenced area reduces the system load as navigation platform 109 can simply focus on monitoring the geofenced area rather than looking at a much larger area.

In one embodiment, navigation platform 109 utilizes one or more system inputs to compute in real-time the best routing option towards a particular destination. In one scenario, the one or more system inputs are: (a) user's destination, (b) user's route towards the destination, (c) any opportunity (geofenced) areas, (d) frequently updated information about the shared vehicles in the opportunity areas, and (e) user's real-time position. In another scenario, the processing of the one or more system inputs and computation of the best routing option is performed in the backend and is transparent to the user.

In another embodiment, navigation platform 109 enables real-time notification to users about faster travels options, even though the users are already on-the-go. For example, 10 minutes after starting a journey, navigation platform 109 determines a faster alternate route upon detecting an availability of a shared bike in the geofenced area of the route, and again a few minutes later but before utilizing the alternate route the navigation platform 109 determines another better alternate route. A user is notified of the alternate routes only if these new routes are better compared to the previously calculated route.

Figure 2:
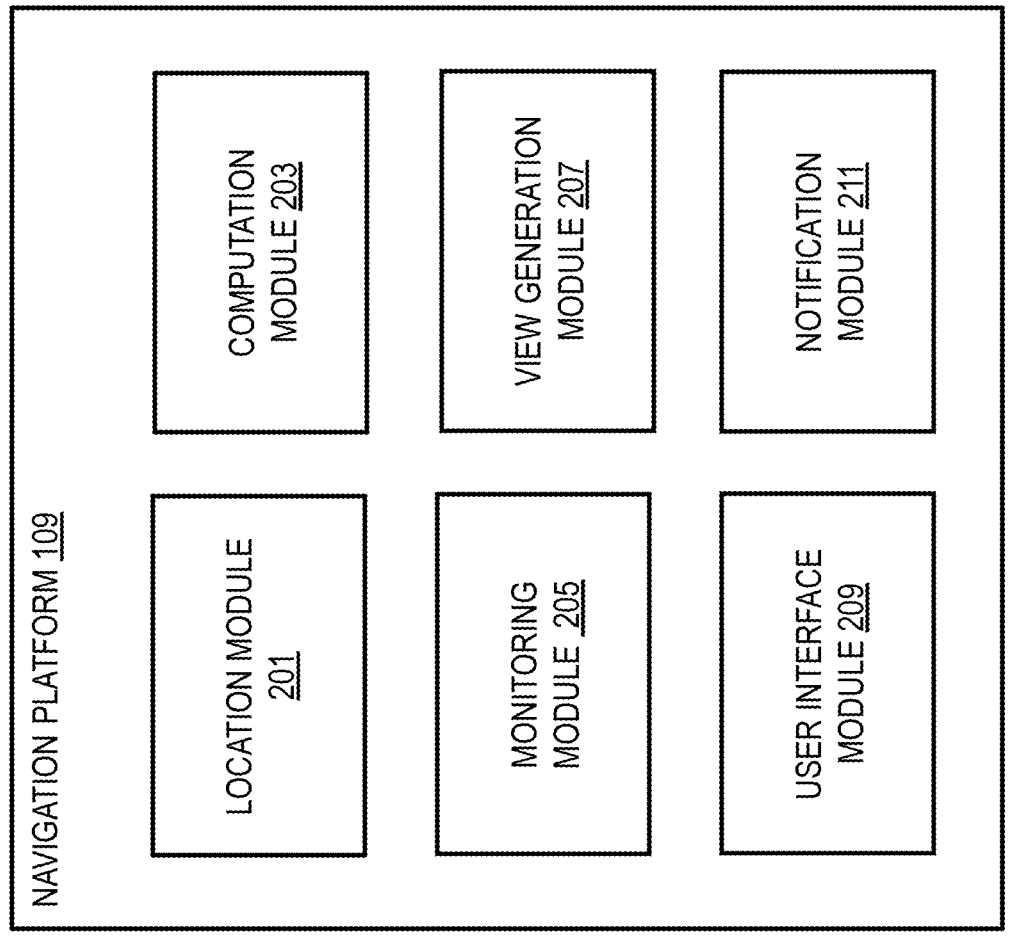
FIG. 2 is a diagram of the components of navigation platform 109, according to one example embodiment.

FIG. 2 is a diagram of the components of navigation platform 109, according to one example embodiment. By way of example, navigation platform 109 includes one or more components for providing a dynamic navigation route based on the availability of a shared vehicle in a geofenced area, according to one embodiment. It is contemplated that the functions of these components may be combined in one or more components or performed by other components of equivalent functionality. In this embodiment, navigation platform 109 includes a location module 201, computation module 203, monitoring module 205, view generation module 207, a user interface module 209, and notification module 211. In another embodiment, one or more of modules 201-211 may be implemented as a cloud-based service, local service, native application, or a combination thereof.

In one embodiment, location module 201 can determine a real-time location of UE 101 and/or a vehicle, e.g., a shared vehicle. In one embodiment, location module 201 determines a location of a UE 101 and/or a vehicle by a triangulation system such as GPS, assisted-GPS (A-GPS), Cell of Origin, or other location extrapolation technologies, as well as proximity location indicators, such as a signal from a wireless local area network (WLAN), a Bluetooth® system, or the like. In one scenario, a standard GPS and A-GPS systems can use satellites to pinpoint the location of UE 101 and/or vehicle 129. In another scenario, a Cell of Origin system can determine the cellular tower that a cellular UE 101 and/or vehicle 129 is synchronized with. This information provides a coarse location of the UE 101 and/or vehicle 129 because the cellular tower can have a unique cellular identifier (cell-ID) that can be geographically mapped. In another embodiment, location module 201 utilizes multiple technologies to detect the location of UE 101 and/or vehicle 129. In one instance, a GPS system may narrow the location of UE 101 to a building, e.g., a subway, and a WLAN signal can determine the location of UE 101 within the building. In another instance, a GPS system may determine vehicle 129 is in a geofenced area and a WLAN signal can determine the position of vehicle 129 within the geofenced area.

In one embodiment, computation module 203 precomputes a geofenced area in a navigation route before the navigation route is used. This geofenced area comprises a shared vehicle provider, and the use of the shared vehicle in the geofenced area can significantly reduce the ETA, the travel distance, or a combination thereof of the navigation route. In another embodiment, computation module 203 receives a real-time location of UE 101 and/or vehicle 129. Thereafter, computation module 203 recomputes the navigation route based on determining that the shared vehicle has become available in the geofenced area. The recomputed navigation route includes a route segment that uses the shared vehicle and is more optimal than the previously calculated navigation route, e.g., ETA of the recomputed navigation route is faster. In another embodiment, computation module 203 transmits the recomputed navigation route to view generation module 207 for a presentation of map images in a user interface of UE 101.

In one embodiment, monitoring module 205 implements a routing algorithm to continually monitor the geofenced area of the navigation route where a shared vehicle service provider operates. Monitoring module 205 detects in real-time any change in the current availability of the shared vehicle, e.g., a user of any type of mobility provider (car, autonomous vehicle, bike, scooter, roller, etc.) has returned the shared vehicle in the geofenced area. Thereafter, monitoring module 205 triggers the reservation of the shared vehicle without the intervention of a user of the navigation route. Based on this determination, monitoring module 205 triggers execution of view generation module 207, which facilitates the querying/retrieval associated map image data from geographic database 111 corresponding to the location.

In one embodiment, view generation module 207 facilitates a gathering of the various map images corresponding to a location selected via a mapping application or service. In addition, view generation module 207 determines and/or retrieves the various map images corresponding to a specified navigation route. It is noted, in certain embodiments, that view generation module 207 facilitates various image rendering, blending, merging and other compilation techniques for producing a user-friendly map image.

In one embodiment, user interface module 209 enables presentation of a graphical user interface for displaying map images in connection with a selected destination in UE 101. By way of example, user interface module 209 generates the user interface element in response to detection of an input for selection of a particular destination. As another example, user interface module 209 enables colorful presentation and highlighting of a specific route related to the particular destination in UE 101. User interface module 209 employs various application programming interfaces (APIs) or other function calls corresponding to applications 103 of UE 101, thus enabling the display of graphics primitives such as menus, buttons, data entry fields, etc., for generating the user interface elements. Still further, user interface module 209 may be configured to operate in connection with augmented reality (AR) processing techniques, wherein various different applications, graphic elements, and features may interact. For example, user interface module 209 coordinates the presentation of augmented reality map images in conjunction with various images for a given location or in response to a selected destination.

In one embodiment, notification module 211 causes a notification of at least one opportunity, e.g., a recomputed navigation route, in UE 101 of a user traveling in a navigation route. In one scenario, the user may receive the notification at any time period during his/her travel in a navigation route. In another scenario, notification module 211 may notify a user based on a determination that a user has reached a particular segment of the navigation route, e.g., a textual alert that geofenced area is approaching and the user needs to exit the subway. The notification may be in the form of a visual alert, an audio alert, a vibration, or a combination thereof. In one scenario, notifications may be adapted with user preferences and tolerances, which, in part, provide a personalized modification of the notification system.

The above-presented modules and components of navigation platform 109 can be implemented in hardware, firmware, software, or a combination thereof. In another embodiment, one or more of the modules 201-211 may be implemented for operation by respective UE 101, navigation platform 109, or combination thereof. Still further, navigation platform 109 may be integrated for direct operation with services 115, such as in the form of a widget or applet, in accordance with an information and/or subscriber sharing arrangement. The various executions presented herein contemplate any and all arrangements and models.

Figure 3:
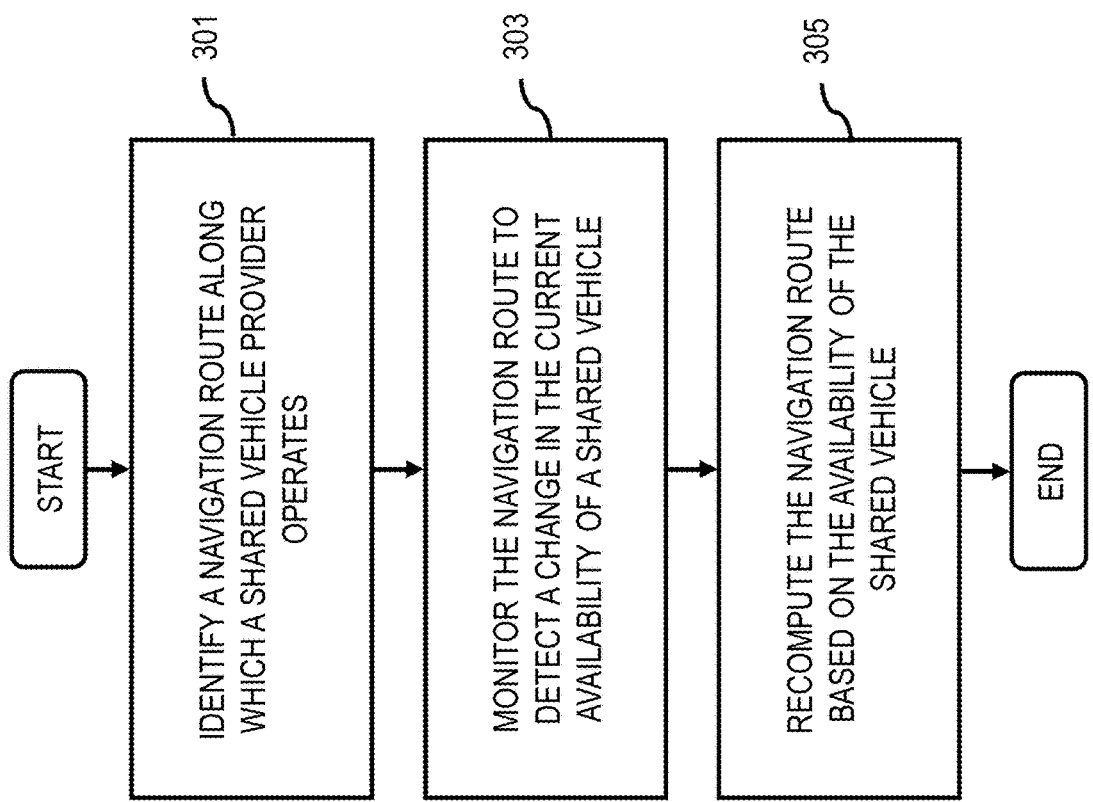
FIG. 3 is a flowchart of a process for providing a dynamic navigation route based on the availability of a shared vehicle in a geofenced area of the navigation route, according to one example embodiment.
Figure 9:
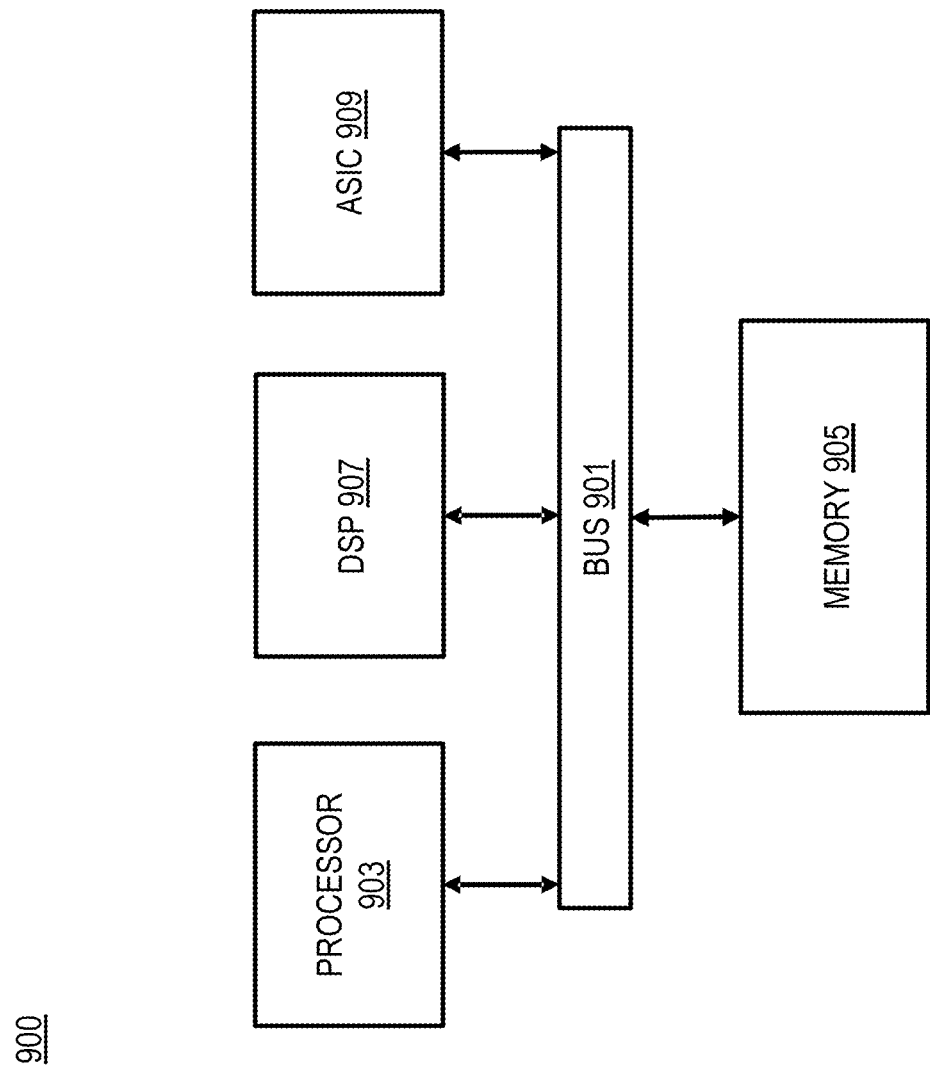
FIG. 9 is a diagram of a chip set that can be used to implement an embodiment.

FIG. 3 is a flowchart of a process for providing a dynamic navigation route based on the availability of a shared vehicle in a geofenced area of the navigation route, according to one example embodiment. In one embodiment, navigation platform 109 performs process 300 and is implemented in, for instance, a chip set including a processor and a memory as shown in FIG. 9. As such, navigation platform 109 and/or any of its component modules can provide means for accomplishing various parts of process 300, as well as means for accomplishing embodiments of other processes described herein in conjunction with other components of system 100. In addition, embodiments describing functions/actions related to navigation platform 109 individually is equally applicable to the other. Although process 300 is illustrated and described as a sequence of steps, its contemplated that various embodiments of process 300 may be performed in any order or combination and need not include all of the illustrated steps.

In step 301, navigation platform 109 identifies a navigation route to at least one destination. The navigation route comprises a geofenced area in which a shared vehicle provider operates, but currently there is no availability of the shared vehicle. In one embodiment, navigation platform 109 precomputes the geofenced area before the navigation route is used. The geofenced area is identified based, at least in part, on determining that a use of the shared vehicle in the geofenced area can reduce the ETA, the travel distance, or a combination thereof of the navigation route. In one embodiment, the navigation route is a multimodal route in which the shared vehicle is a transport option for at least one route segment.

In step 303, navigation platform 109 monitors the navigation route to detect a change in the current availability of the shared vehicle. In one embodiment, monitoring the navigation route comprises monitoring the geofenced area of the navigation route to detect any availability of the shared vehicle. In one scenario, the shared vehicle becomes available immediately after the vehicle is returned by the user, e.g., a vehicle return event. Furthermore, the change in the current availability of the shared vehicle is detected based on a non-predictive data. In another embodiment, navigation platform 109 initiates a reservation of the shared vehicle without the intervention of a user of the navigation route. In one example embodiment, navigation platform 109 detects the availability of the shared vehicle within the geofenced area and automatically reserves the shared vehicle. In another example embodiment, navigation platform 109 detects the availability of a ride-sharing bicycle at a geofenced area 30 minutes away from the current location of a user, and determines it is faster for the user to switch to the ride-sharing bicycle instead of continuing on the original route. Thereafter, navigation platform 109 reserves (or locks) the ride-sharing bicycle in an efficient manner, e.g., it is inefficient to reserve the ride-sharing bicycle for 30 minutes when it can be used by someone else during that time. Navigation platform 109 may implement several policies for efficient reservation, such as but not limited to: (a) limit the reservation for a specific time period, e.g., 10 minutes; (b) allow reservation over the specific time period only if there are many available shared vehicles in the area; or (c) impose a fee for a reservation over the specified time period if there are fewer number of available shared vehicles. In one scenario, with mobility as a service (MaaS) one or more users may have a permit, e.g., a mobility pass, that allows these users to combine several modes of transportation every month, e.g., all subways+100 minutes on shared vehicles+20 minutes on rental car services. These users are free to use their credit as they want, e.g., the users can decide if the gain of time is worth the money, and can reserve the shared vehicles per their requirement while traveling towards a particular destination.

In step 305, navigation platform 109 recomputes the navigation route to include a route segment that uses the shared vehicle based, at least in part, on determining that the shared vehicle has become available. In one embodiment, navigation platform 109 provides data for presenting the recomputed navigation route in a user interface of a device, e.g., UE 101, associated with a user of the navigation route based, at least in part, on determining that the ETA of the recomputed navigation route is faster than the previous navigation route.

Figure 4:
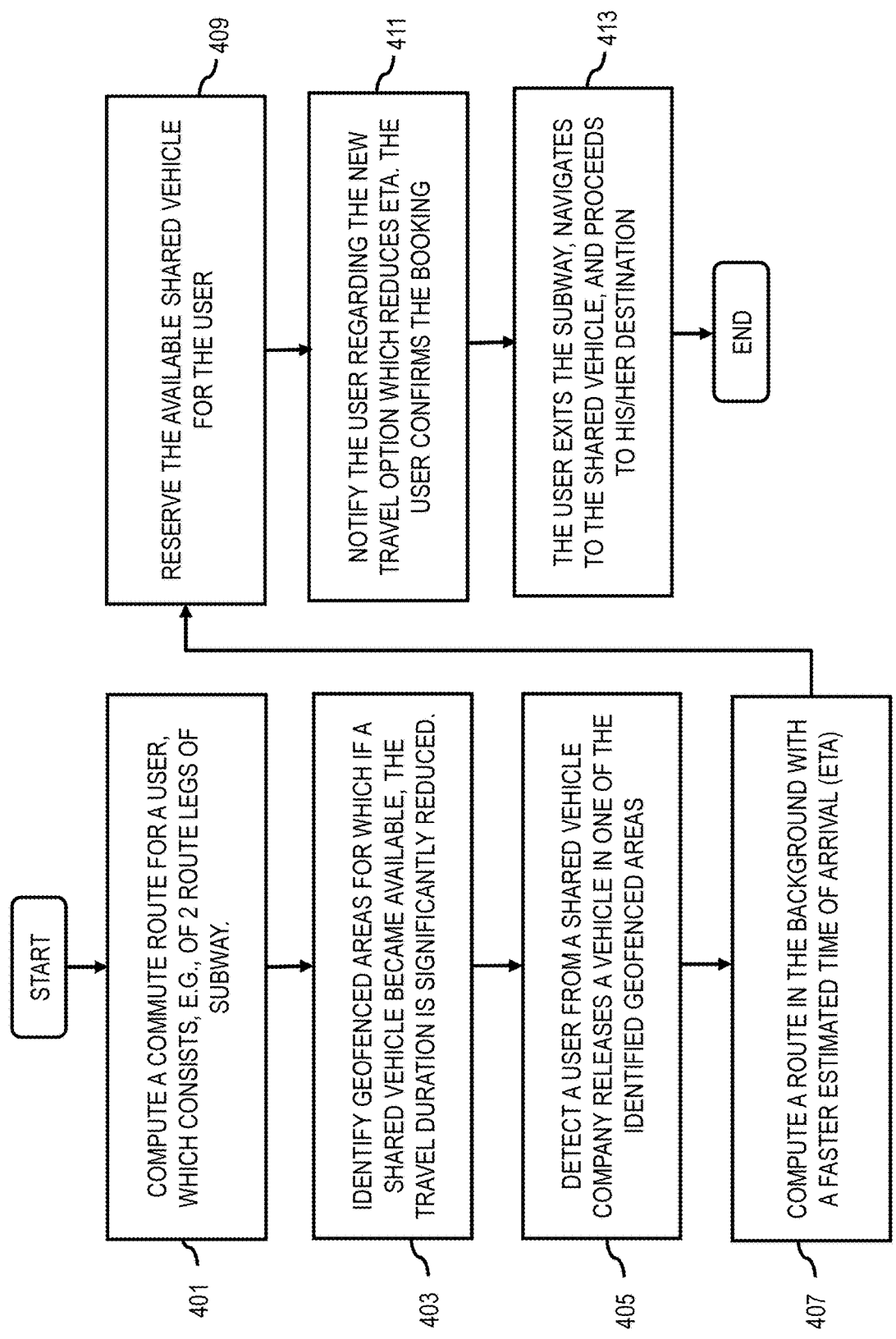
FIG. 4 is a flowchart of a process for recomputing a navigation route based on the availability of a shared vehicle in a geofenced area, reserving the shared vehicle, and then notifying a user of the new travel option, according to one example embodiment.

FIG. 4 is a flowchart of a process for recomputing a navigation route based on the availability of a shared vehicle in a geofenced area, reserving the shared vehicle, and then notifying a user of the new travel option, according to one example embodiment. Although process 400 is illustrated and described as a sequence of steps, it is contemplated that various embodiments of process 400 may be performed in any order or combination and need not include all of the illustrated steps. In step 401, navigation platform 109 processes trip detail of a user to compute a navigation route, e.g., a navigation route from user A's real-time position towards at least one destination. In one scenario, the navigation route comprises two route legs of a subway channel. In step 403, navigation platform 109 precomputes geofenced areas based on determining that a use of shared vehicles in the geofenced area can significantly reduce the ETA and travel distance. In one embodiment, navigation platform 109 determines geofenced areas based, at least in part, on a distance threshold, a travel-time threshold, or a combination thereof. Thereafter, navigation platform 109 continuously monitors the identified geofenced area in the navigation route for any availability of shared vehicles to significantly reduce the travel duration and travel distance. In one example embodiment, a navigation route including route segments associated with geofenced areas is the optimal route compared to an originally computed route. Thereafter, in step 405, navigation platform 109 detects the availability of a shared vehicle in the identified geofenced area, e.g., user B from a shared vehicle company releases a shared vehicle. Subsequently, in step 407, navigation platform 109 computes a new route segment in the background based on the availability of the shared vehicle. In one scenario, the new route segment has a faster ETA from the user's real-time position to the at least one destination. In step 409, navigation platform 109 proactively reserves the available shared vehicle for the user. Then, in step 411, navigation platform 109 informs the user about the new route segment with faster ETA, e.g., by 10 minutes, and is also considered more enjoyable than the previously computed routes. Thereafter, the user confirms the booking. Subsequently, in step 413 the user changes his current route, e.g., by exiting the subway as suggested by navigation platform 109, and is guided towards the shared vehicle, which he uses to travel to the destination.

Figure 5A:
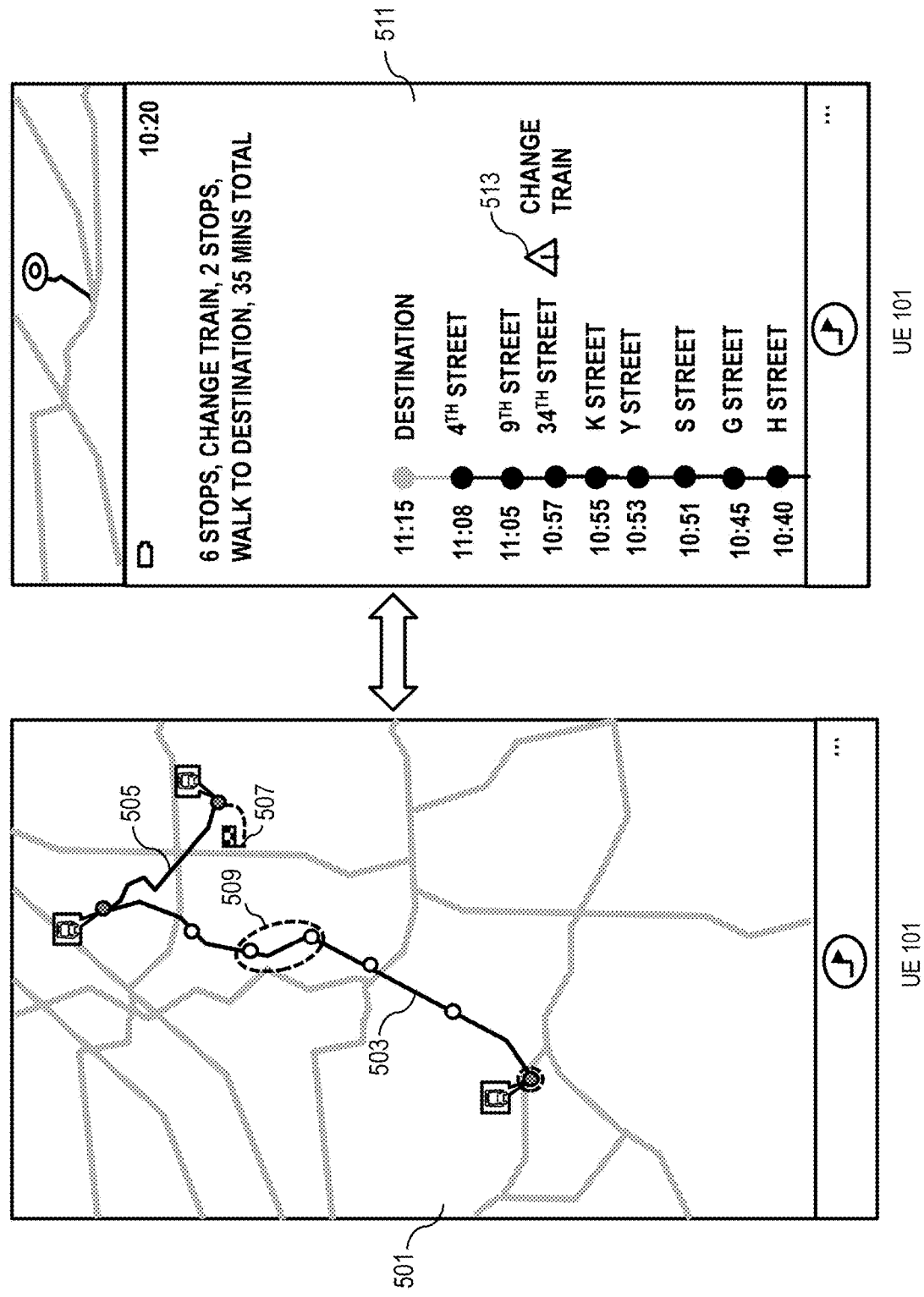
FIGS. 5A-B are user interface diagrams utilized in the process of providing a dynamic navigation route based on the availability of a shared vehicle in a geofenced area, according to one example embodiment.
Figure 5B:
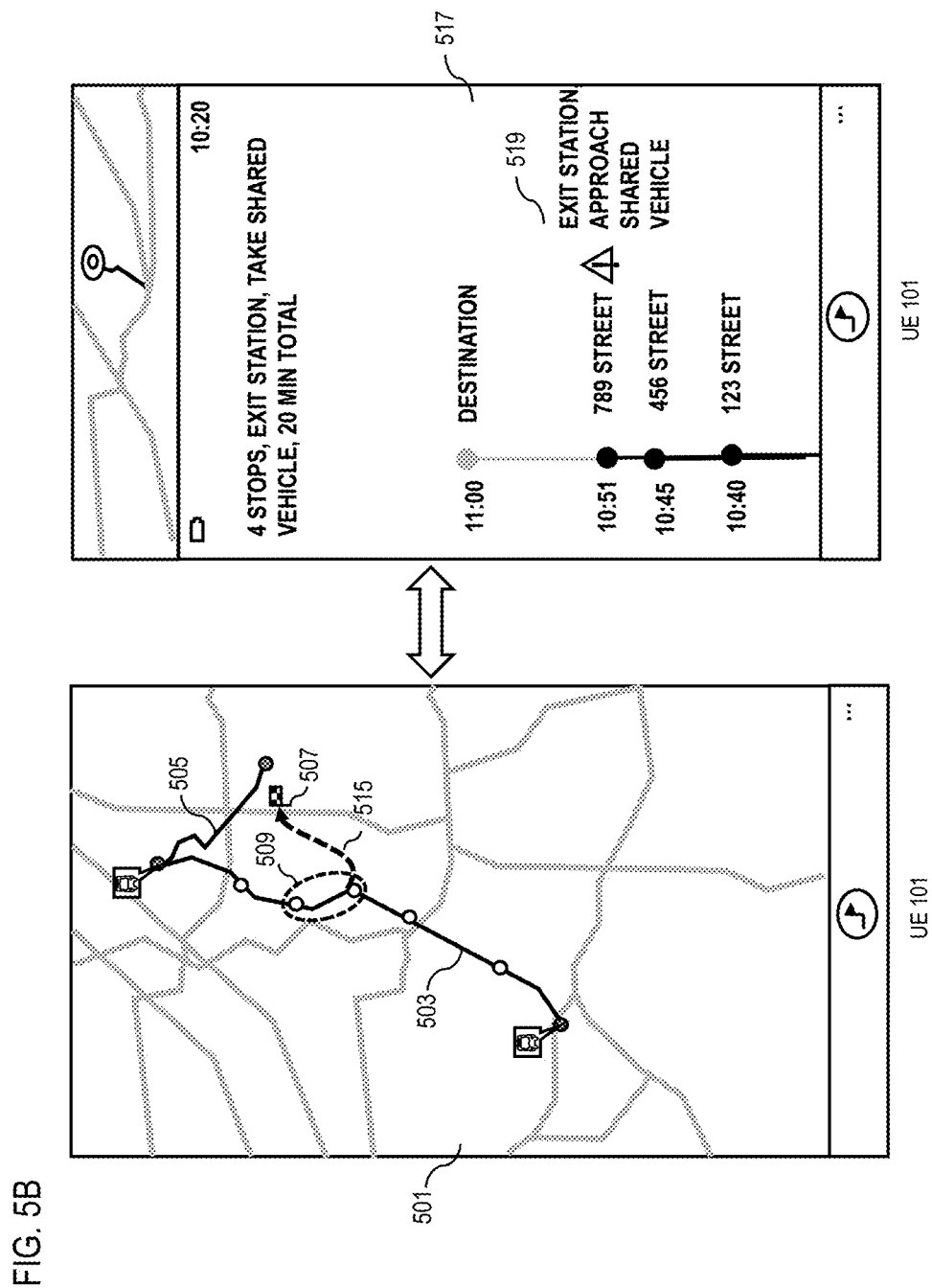

FIGS. 5A-B are user interface diagrams utilized in the process of providing a dynamic navigation route based on the availability of a shared vehicle in a geofenced area, according to one example embodiment. In one scenario, user A is presented with a map view 501 in his/her UE 101. Map view 501 includes travel lines 503 and 505 towards destination 507. Travel line 503 includes geofenced area 509 in which a shared vehicle provider operates. In one scenario, geofenced area 509 is precomputed before the navigation route is determined. In another scenario, geofenced area 509 is identified by navigation platform 109 based on determining that using a shared vehicle in geofenced area 509 can reduce the ETA and/or the travel distance. Thereafter, navigation platform 109 continuously monitors geofenced area 509 for any availability of shared vehicles. In another scenario, user A is presented with interface 511 comprising a duration of travel and/or the number of stops. Furthermore, interface 511 includes train numbers, platform numbers, alert for delay train arrival etc. In addition, user A is provided with a notification 513 once the user reaches the train station and needs to board another train.

As illustrated in FIG. 5B, navigation platform 109 detects the availability of a shared vehicle, e.g., a shared bike, a shared autonomous vehicle, etc., in geofenced area 509, e.g., user B of the shared vehicle provider frees a bike in geofenced area 509. Thereafter, navigation platform 109 recomputes the navigation route, e.g., segment 515 in travel line 503, based on determining that a shared vehicle has become available. Additionally, navigation platform 109 reserves the shared vehicle for user A. Subsequently, navigation platform 109 presents the recomputed route in UE 101 based, at least in part, on determining that recomputed route is faster than the previous route. In one scenario, user A is presented with interface 517 wherein user A is notified about a new travel option which reduces the ETA, e.g., by 15 minutes. The user selects the newly presented option of segment 515 in travel line 503 and confirms the booking of the shared vehicle. In one scenario, user A is provided with a notification 519 once the user reaches the train station to exit the subway and take the reserved shared vehicle to destination 507.

Figure 6:
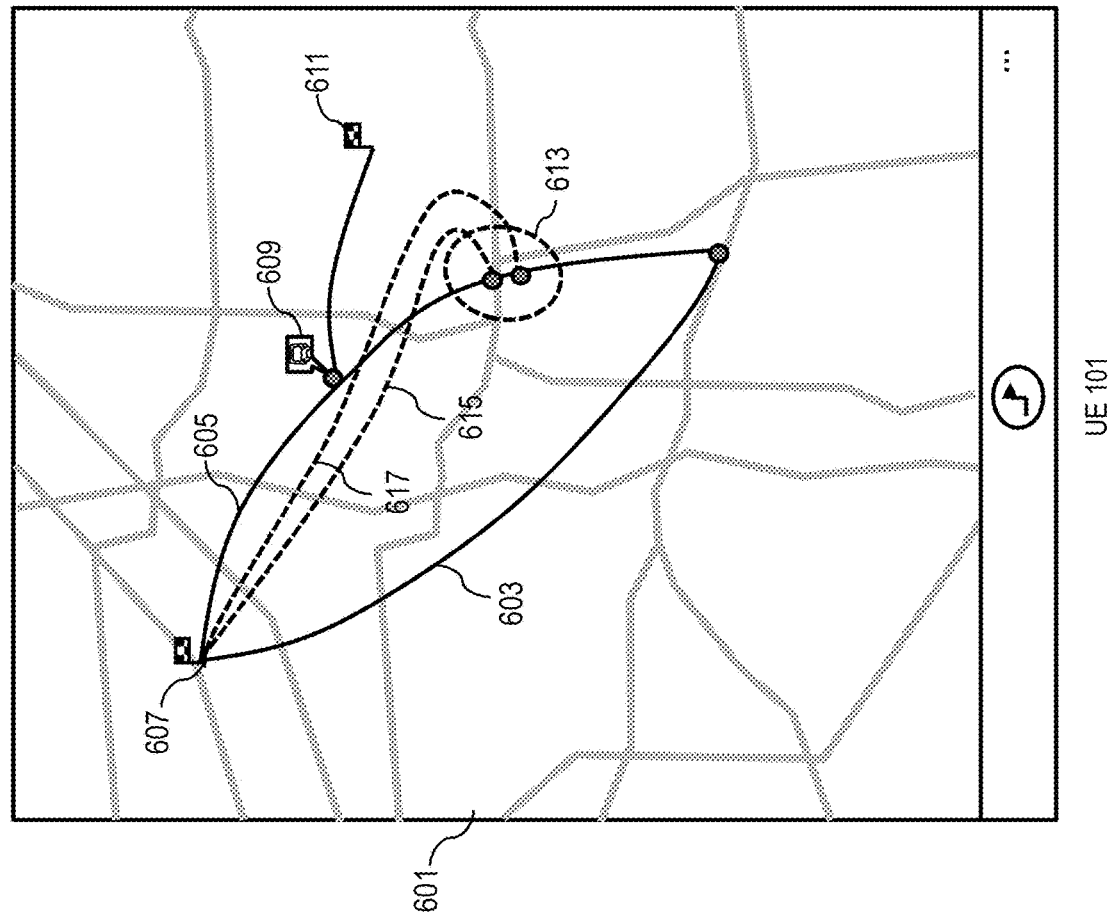
FIG. 6 is a user interface diagram utilized in the process of presenting a dynamic navigation route based on drop-off possibilities, according to one example embodiment.

FIG. 6 is a user interface diagram utilized in the process of presenting a dynamic navigation route based on drop-off possibilities, according to one example embodiment. In one scenario, user A is presented with a map view 601 in his/her UE 101. Map view 601 includes travel lines 603 and 605 towards destination 607, e.g., the workplace of user A. In one scenario, travel line 603 is the fastest route, and travel line 605 is the safest route because user A gets to travel with his wife. If user A selects travel line 605, he can drop-off his wife at station 609, whereupon she can travel to her destination 611, e.g., workplace, and he can continue his journey towards destination 607.

As depicted in FIG. 6, travel line 605 comprises precomputed geofenced area 613. Navigation platform 109 continuously monitors geofenced area 613 for any availability of shared vehicles and calculates dynamic travel lines 615 and 617 based on the availability of shared vehicles. These dynamic travel lines 615 and 617 are faster than travel line 605 and can reduce ETA and/or travel distance towards destination 607. In one example embodiment, user A selects travel line 605 because he wants to travel with his wife. Subsequently, he can switch to travel lines 615 or travel lines 617 based on the availability of shared vehicles. Accordingly, user A gets to travel with his wife and reach his destination 607 at an optimum time.

Returning to FIG. 1, by way of example, UE 101 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that UE 101 can support any type of interface to the user (such as "wearable" circuitry, etc.). In one embodiment, UE 101 may be associated with vehicle 129 or be a component part of vehicle 129.

In one embodiment, application 103 may also be any type of application that is executable on the UE 101 and/or vehicle 129, such as autonomous driving applications, mapping applications, location-based service applications, navigation applications, content provisioning services, camera/imaging application, media player applications, social networking applications, calendar applications, and the like. In one embodiment, the application 103 may act as a client for navigation platform 109 and perform one or more functions associated with generating a dynamic navigation route based on the availability of a shared vehicle in a geofenced area.

In one embodiment, vehicle 129 is any vehicles, e.g., an autonomous vehicle, equipped with a variety of sensors 105 including but not limited to location sensors, e.g., configured to process signals from positioning satellites 119, e.g., a Global Positioning System (GPS) satellite, and other sensors, e.g., camera sensor, LiDAR sensor, RADAR sensor, etc., to assist in correctly localizing vehicle 129 on a map. In one embodiment, accurate determination of vehicle 129's location on the map enables planning of a route, both on fine and coarse scales. On a coarse scale, navigation maps, e.g., a digital map provided from geographic database 111, allow vehicles 129 to know what roads to use to reach a particular destination. However, on a finer scale, digital maps allow vehicles 129 to know what lanes to be in and when to make lane changes, e.g., lane-level localization.

In one embodiment, UE 101 and/or vehicle 129 are configured with various sensors 105 for generating or collecting environmental image data, e.g., for processing by navigation platform 109, related geographic data, etc. In one embodiment, the sensed data represent sensor data associated with a geographic location or coordinates at which the sensor data was collected. By way of example, sensors 105 may include a global positioning sensor for gathering location data, e.g., GPS, a network detection sensor for detecting wireless signals or receivers for different short-range communications, e.g., Bluetooth, Wi-Fi, Li-Fi, near field communication (NFC) etc., temporal information sensors, a camera/imaging sensor for gathering image data, e.g., the camera sensors may automatically capture ground control point imagery, etc. for analysis, an audio recorder for gathering audio data, velocity sensors mounted on steering wheels of the vehicles, switch sensors for determining whether one or more vehicle switches are engaged, and the like.

In one embodiment, communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network, e.g., the Internet, short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, navigation platform 109 has connectivity over a communication network 107 to services platform 113, e.g., an OEM platform, that provides one or more services 115, e.g., sensor data collection services. By way of example, services 115 may also be other third-party services and include mapping services, navigation services, travel planning services, notification services, social networking services, content, e.g., audio, video, images, etc., provisioning services, application services, storage services, contextual information determination services, semantic information determination services, location-based services, information-based services, e.g., weather, news, etc. By way of example, services 115 may be an online service that reflects interests and/or activities of users. In one scenario, services 115 provide representations of each user (e.g., a profile), his/her social links, and a variety of additional information. Services 115 allow users to share location information, activities information, contextual information, and interests within their individual networks, and provides for data portability. Services 115 may additionally assist in providing the navigation platform 109 with travel information of the one or more geo-routes and/or location anchors, etc.

In one embodiment, content providers 117a-117n (collectively referred to as content providers 117) may provide content or data, e.g., including geographic data, parametric representations of mapped features, sensor data, image data, map data, contextual information, semantic information, etc., to geographic database 111, navigation platform 109, services platform 113, services 115, and vehicle 129. The content provided may be any type of content, such as image content, map content, textual content, audio content, video content, etc. In one embodiment, content providers 117 may also store content associated with geographic database 111, navigation platform 109, services platform 113, services 115, UE 101, and/or vehicle 129. In another embodiment, content providers 117 may manage access to a central repository of data and offer a consistent, standard interface to data, such as a repository of geographic database 111.

By way of example, navigation platform 109, services platform 113, services 115, vehicle 129, UE 101, and/or content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
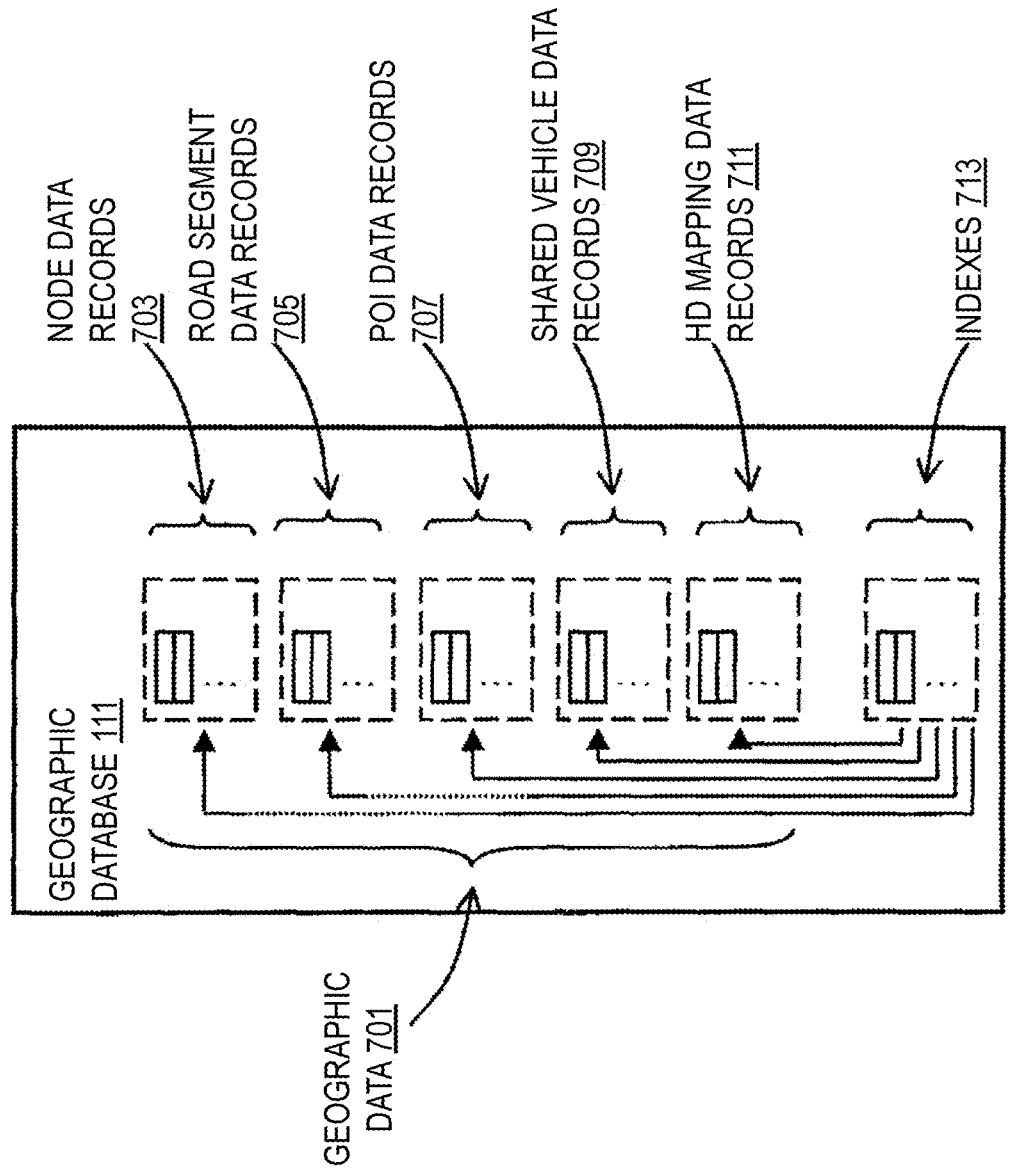
FIG. 7 is a diagram of a geographic database, according to one embodiment.

FIG. 7 is a diagram of a geographic database, according to one embodiment. In one embodiment, geographic database 111 includes geographic data 701 used for (or configured to be compiled to be used for) mapping and/or navigation-related services, such as for video odometry based on the mapped features, e.g., lane lines, road markings, signs, etc. In one embodiment, geographic database 111 includes high resolution or high definition (HD) mapping data that provide centimeter-level or better accuracy of map features. For example, geographic database 111 can be based on Light Detection and Ranging (LiDAR) or equivalent technology to collect billions of 3D points and model road surfaces and other map features down to the number lanes and their widths. In one embodiment, the HD mapping data, e.g., HD mapping data records 711, capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 111 follows certain conventions. For example, links do not cross themselves and do not cross each other except at a node. Also, there are no duplicated shape points, nodes, or links. Two links that connect each other have a common node. In geographic database 111, overlapping geographic features are represented by overlapping polygons. When polygons overlap, the boundary of one polygon crosses the boundary of the other polygon. In geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, geographic database 111 includes node data records 703, road segment or link data records 705, POI data records 707, shared vehicle data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in geographic database 111. In one embodiment, the indexes 713 may be used to quickly locate data without having to search every row in geographic database 111 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, geographic database 111 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. Geographic database 111 can include data about the POIs and their respective locations in the POI data records 707. Geographic database 111 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, geographic database 111 can also include shared vehicle data records 709 for storing information pertaining to geofenced areas where shared vehicle provider operates, e.g., location information of the geofenced areas, temporal information (e.g., opening hours) of the geofenced areas, total number of shared vehicles operating in each of the geofenced areas, availability information of the shared vehicles in each of the geofenced areas, etc. In another embodiment, shared vehicle data records 709 stores information relating to the one or more shared vehicles, e.g., vehicle type, vehicle features, reservation cost information, etc. By way of example, shared vehicle data records 709 can be associated with one or more of the node data records 703, road segment data records 705, and/or POI data records 707 to support localization and opportunistic use of the shared vehicles during navigation.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, road signs, lane level speed limit information, and/or the like. In one embodiment, the HD mapping data records 711 are divided into spatial partitions of varying sizes to provide HD mapping data to vehicles 129 and other end user devices with near real-time speed without overloading the available resources of the vehicles 129 and/or devices, e.g., computational, memory, bandwidth, etc. resources.

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions, e.g., potholes, road friction, road wear, etc., with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, geographic database 111 can be maintained by the content provider 117 in association with the services platform 113, e.g., a map developer. The map developer can collect geographic data to generate and enhance geographic database 111. There can be different ways used by the map developer to collect data. These ways can include obtaining data from other sources, such as municipalities or respective geographic authorities. In addition, the map developer can employ field personnel to travel by vehicle, e.g., vehicle 129 and/or UE 101, along roads throughout the geographic region to observe features and/or record information about them, for example. Also, remote sensing, such as aerial or satellite photography, can be used.

Geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 129 or UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a dynamic navigation route based on the availability of a shared vehicle in a geofenced area may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
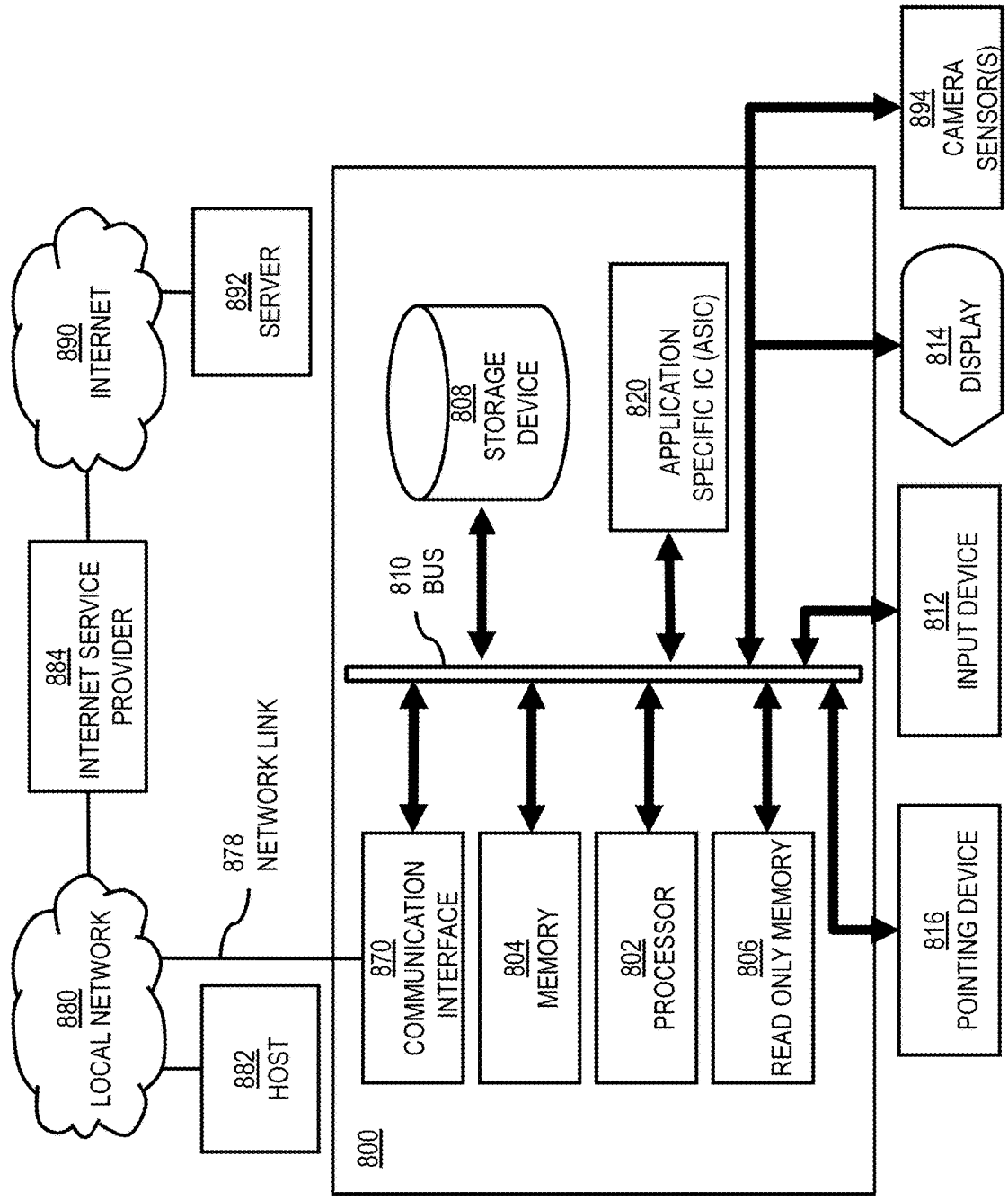
FIG. 8 is a diagram of hardware that can be used to implement an embodiment.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a dynamic navigation route based on the availability of a shared vehicle in a geofenced area as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a dynamic navigation route based on the availability of a shared vehicle in a geofenced area.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to provide a dynamic navigation route based on the availability of a shared vehicle in a geofenced area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing a dynamic navigation route based on the availability of a shared vehicle in a geofenced area. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a dynamic navigation route based on the availability of a shared vehicle in a geofenced area, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for providing a dynamic navigation route based on the availability of a shared vehicle in a geofenced area to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a dynamic navigation route based on the availability of a shared vehicle in a geofenced area as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing a dynamic navigation route based on the availability of a shared vehicle in a geofenced area.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a dynamic navigation route based on the availability of a shared vehicle in a geofenced area. The memory 905 also stores the data associated with or generated by the execution of the inventive steps.

Figure 10:
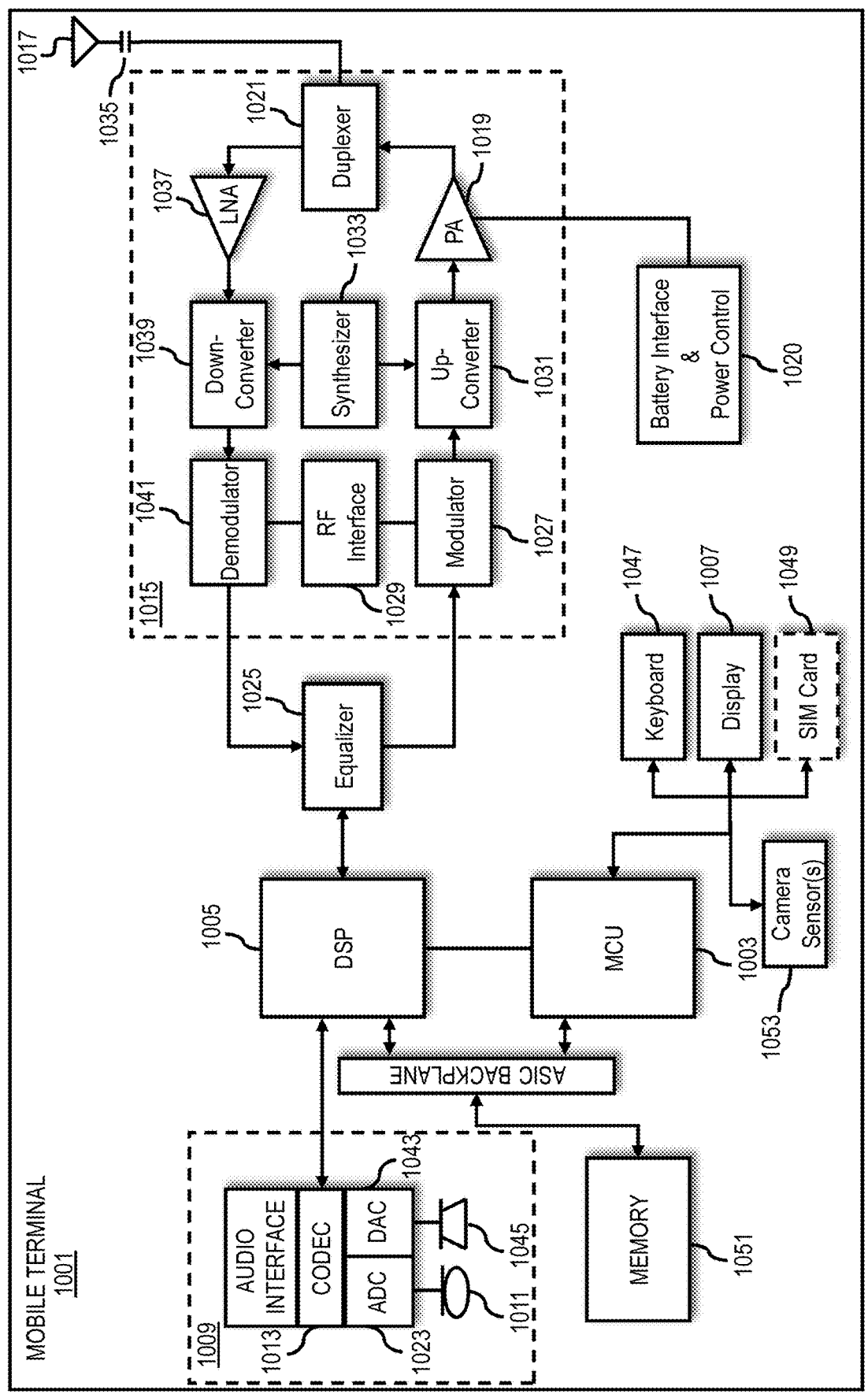
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset or vehicle or part thereof) for communications, which is capable of operating in the system of FIG. 1, according to one embodiment. In some embodiments, mobile terminal 1001, or a portion thereof, constitutes a means for performing one or more steps of providing a dynamic navigation route based on the availability of a shared vehicle in a geofenced area. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a dynamic navigation route based on the availability of a shared vehicle in a geofenced area. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The Pa. 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023.

The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a dynamic navigation route based on the availability of a shared vehicle in a geofenced area. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for an opportunistic use of a shared vehicle for a navigation route comprising:
computing the navigation route along which a shared vehicle provider operates based, at least in part, on a distance threshold, wherein the navigation route is an optimal route;
monitoring the navigation route along a first route segment during a first transport option to detect a change in current availability of the shared vehicle, wherein the navigation route is a multimodal route in which the shared vehicle is a second transport option for at least a second route segment; and
recomputing the navigation route to include the second route segment associated with the shared vehicle based on determining that the detected change indicates that the shared vehicle has become available.

2. The method of claim 1, wherein the monitoring of the navigation route comprises monitoring a geofenced area of the navigation route to detect the change in the current availability of the shared vehicle.

3. The method of claim 2, further comprising:
identifying the geofenced area based on determining that a use of the shared vehicle in the geofenced area can reduce an estimated time of arrival, a travel distance, or a combination thereof of the navigation route.

4. The method of claim 2, wherein the geofenced area is precomputed before the navigation route is used.

5. The method of claim 1, wherein the change indicating that the shared vehicle has become available is detected based on a vehicle return event.

6. The method of claim 1, further comprising:
initiating a reservation of the shared vehicle without intervention of a user of the navigation route.

7. The method of claim 1, wherein the change is detected based on non-predictive data about the current availability of the shared vehicle.

8. The method of claim 1, further comprising:
providing data for presenting the recomputed navigation route in a user interface of a device associated with a user of the navigation route.

9. The method of claim 8, wherein the data for presenting the navigation route is provided based on determining that an estimated time of arrival of the recomputed navigation route is faster.

10. An apparatus for an opportunistic use of a shared vehicle for a navigation route comprising:
at least one processor; and
at least one memory including computer program code for one or more programs,
the at least one memory and the computer program code configured to, with the at least one processor, cause the apparatus to perform at least the following,
compute a geofenced area of the navigation route in which a shared vehicle provider operates but in which there is no current availability of a shared vehicle;
monitor the geofenced area along a first route segment during a first transport option to detect a change in the current availability of the shared vehicle, wherein the navigation route is a multimodal route in which the shared vehicle is a second transport option for at least a second route segment; and
recompute the navigation route to include the second route segment associated with the shared vehicle in the geofenced area based on determining that the detected change indicates that the shared vehicle has become available.

11. The apparatus of claim 10, wherein the change indicating that the shared vehicle has become available is detected based on a vehicle return event.

12. The apparatus of claim 10, wherein the apparatus is further caused to:
initiate a reservation of the shared vehicle without intervention of a user of the navigation route.

13. The apparatus of claim 10, wherein the apparatus is further caused to:
provide data for presenting the recomputed navigation route in a user interface of a device associated with a user of the navigation route.

14. The apparatus of claim 13, wherein the data for presenting the navigation route is provided based on determining that an estimated time of arrival of the recomputed navigation route is faster.

15. A non-transitory computer-readable storage medium for an opportunistic use of a shared vehicle for a navigation route, carrying one or more sequences of one or more instructions which, when executed by one or more processors, cause an apparatus to perform:
computing a geofenced area of the navigation route in which a shared vehicle provider operates but in which there is no current availability of a shared vehicle;
monitoring the geofenced area along a first route segment during a first transport option to detect a change in the current availability of the shared vehicle, wherein the navigation route is a multimodal route in which the shared vehicle is a second transport option for at least a second route segment; and
recomputing the navigation route to include the second route segment associated with the shared vehicle in the geofenced area based on determining that the detected change indicates that the shared vehicle has become available.

16. The non-transitory computer-readable storage medium of claim 15, wherein the change indicating that the shared vehicle has become available is detected based on a vehicle return event.

17. The non-transitory computer-readable storage medium of claim 15, wherein the apparatus is caused to further perform:
initiating a reservation of the shared vehicle without intervention of a user of the navigation route.

18. The non-transitory computer-readable storage medium of claim 15, wherein the apparatus is caused to further perform:
providing data for presenting the recomputed navigation route in a user interface of a device associated with a user of the navigation route.

19. The non-transitory computer-readable storage medium of claim 15, wherein the data for presenting the navigation route is provided based on determining that an estimated time of arrival of the recomputed navigation route is faster.

* * * * *